Nov. 12, 1968 P. GUGGER ETAL 3,410,980
METHOD OF PRODUCING THE INDIVIDUAL MAGNETS OF A CIRCULAR PATH
ATOMIC PARTICLE ACCELERATOR INCLUDING FINISHING
THE SURFACE OF THE POLES BY ELECTRICAL
DISCHARGE MACHINING

Filed May 6, 1965 2 Sheets-Sheet 1

INVENTORS:
PAUL GUGGER
UDO STRASSER

By Breitenfeld & Levine
ATTORNEYS

Nov. 12, 1968   P. GUGGER ETAL   3,410,980
METHOD OF PRODUCING THE INDIVIDUAL MAGNETS OF A CIRCULAR PATH
ATOMIC PARTICLE ACCELERATOR INCLUDING FINISHING
THE SURFACE OF THE POLES BY ELECTRICAL
DISCHARGE MACHINING
Filed May 6, 1965   2 Sheets-Sheet 2
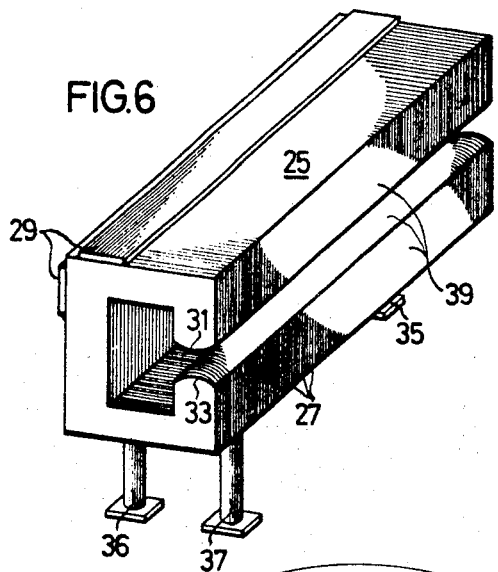
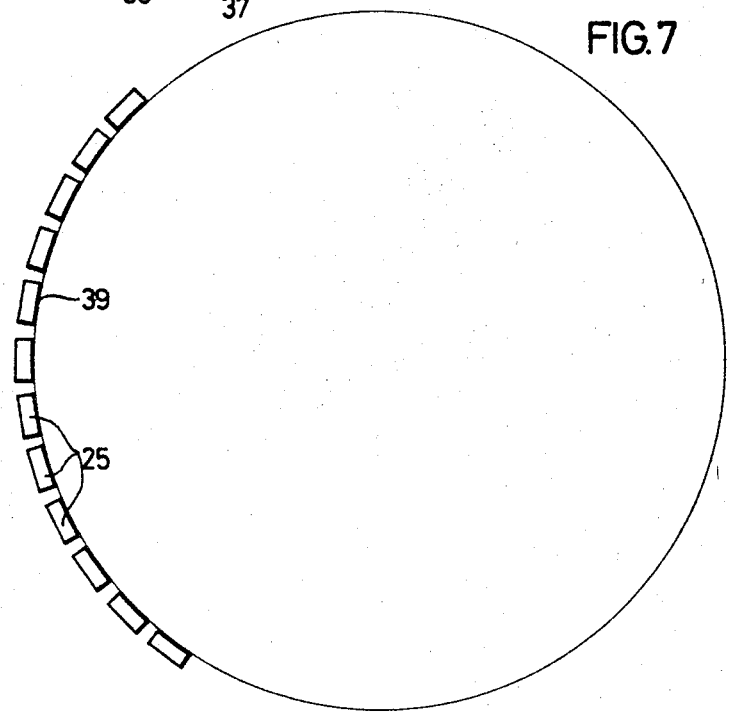
INVENTORS:
PAUL GUGGER
UDO STRASSER
By Breitenfeld & Levine
ATTORNEYS United States Patent Office 3,410,980
Patented Nov. 12, 1968

3,410,980
METHOD OF PRODUCING THE INDIVIDUAL MAGNETS OF A CIRCULAR PATH ATOMIC PARTICLE ACCELERATOR INCLUDING FINISHING THE SURFACE OF THE POLES BY ELECTRICAL DISCHARGE MACHINING
Paul Gugger, Watt, and Udo Strasser, Wallisellen, Switzerland, assignors to Oerlikon Engineering Company, Zurich, Switzerland, a corporation of Switzerland
Filed May 6, 1965, Ser. No. 543,774
1 Claim. (Cl. 219—69)

ABSTRACT OF THE DISCLOSURE

Magnetic cores formed of metal laminations are machined in situ, i.e., after they have been installed in their locations of use, by an electrical discharge technique.

This invention relates to the manufacture of magnetic structures and has particular reference to a method and apparatus for imparting precise dimensions to the metal components thereof, e.g., the metal laminations of which the structure is built. Such structures include electromagnets, transformers, and other electromagnetic machines. The invention is applicable to individual elements, to laminations assembled in stacks, or to the metal parts after they have become incorporated in the magnetic structure.

The invention involves a treatment in which at least one of the steps, usually the final step, is an electro-erosive procedure, e.g., electrical discharge machining.

Iron laminations are commonly used in the active parts of electromagnetic machines and equipment because of their low magnetic reversal losses. The structures are built up of stacks of such laminations separated by insulating layers to reduce eddy current loses.

Only the simplest and most economical manufacturing processes are employed in the production of such laminations. Straight and circular edge configurations are produced by shears; more complex configurations are attained by punching or stamping operations.

Experience has shown that there must be a certain amount of play between a punching tool and the die with which it cooperates. The metal being punched is always drawn slightly into the die at the outset of the punching procedure, and it is only thereafter that the separation takes place. As a result, a burr is formed on one of the surfaces of the punched or stamped sheet. In the working of dynamo-iron sheets the punching tools are subjected to unusually great abrasion, and the formation of burrs is correspondingly aggravated. If such burred sheets are formed into stacks of the character hereinbefore referred to, the insulating layers between them are likely to be by-passed by metal-to-metal contacts, and this causes high eddy current losses.

All known mechanical machining processes produce burrs of this undesirable kind. In order to overcome their disadvantages it has been necessary heretofore to remove them, e.g., by special grinding operations before stacking or by burning or melting them away after stacking.

A similar disadvantage occurs in the case of so-called grain-oriented sheets of magnet metal, since the inescapable cutting pressure of shear blades permanently deforms the sheet prior to the actual separation along the cut edge. This deformation impairs the texture of the sheet whereby high magnetic reversal losses result. The sheet can be restored to its original condition only by a heat treatment subsequently performed.

Another shortcoming of commonly employed machining procedures stems from the circumstances that waviness and irregularities in the sheet, which can hardly ever be avoided, are the cause of numerous defects. For example, if a punching instrument punches a number of openings simultaneously, the sheet may stretch irregularly and the distances between them may not be accurately as planned. If sheets thus formed are stacked together the contours are not in all regions accurately in registery.

These disadvantages occur wherever structures are formed of stacked metal laminations, even in the case of magnets to be energized by direct current since such magnetic structures may also, for the purpose of magnetic uniformity, be made of laminations. The dimensional accuracy varies from layer to layer, due to the wear and tear of the punching tools, and this is a great disadvantage where a large series of laminations is being punched.

Similar difficulties, due to dimensional inaccuracies, occur in the case of very large structural parts, where unusually small tolerances in size are required. For example, in circular-path atomic-particle accelerators, a final machining process, in situ, is highly desirable in order to impart precise final dimensions, since heavy structures are subjected after installation to unpredictable changes in form and contour because of sagging, as a result of which considerable deviations from desired dimensional ranges often occur.

These disadvantages and difficulties can be overcome by the present invention which prescribes that at least one of the machining steps of the metal component or lamination, either before assembly or after it has become incorporated in the final structure, is an electro-erosive procedure.

A feature of the apparatus for performing this procedure resides in the provision of an elongated electrode carrier and the mounting thereon of insulated guides.

The electro-erosive machining can be performed on the individual element or lamination, on the laminated assembly after the sheets have been stacked together, or on the final structure. In the manufacture of parts or structures of complicated or unusual configurations, suitable guides can be provided to control the electrode movements.

The invention is depicted in the accompanying drawings, in which:

FIG. 6 is a perspective view of an electromagnet forming part of an accelerator; and FIG. 7 is a schematic view of a circular accelerator.

FIGURE 1 shows, by way of example, how an electrode 13 is employed to machine an opening transversely through a metallic body 14 composed of a stack of metal laminations.

Figure 1:
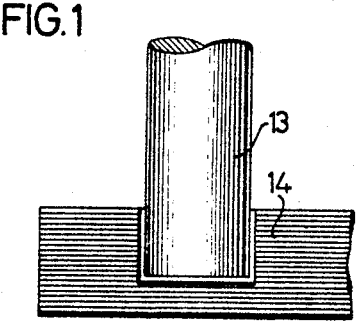
FIG. 1 is a cross-sectional view of a stack of laminations being penetrated by an electrode in accordance with this invention.
Figure 2:
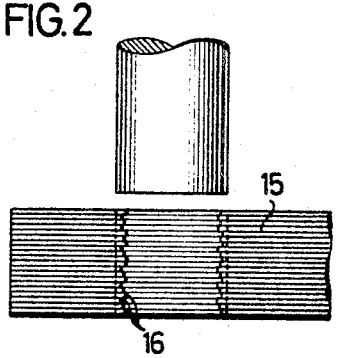
FIG. 2 is a similar view showing a finishing operation upon a stack that has been formed by conventional means.

In FIGURE 2, a similar body 15 is shown, formed of individual laminations that were treated by known mechanical means. The undesirable displacements 16 resulting from various causes hereinbefore referred to can be eliminated, and the desired precise dimensions attained, by utilization of the electro-erosive process exemplified by the electrode shown. The accurate alignment and registry to be accomplished by the finishing operation is indicated by the dotted lines.

Figure 3:
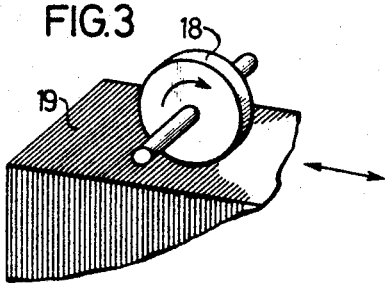
FIG. 3 and FIG. 4 are perspective views showing disk electrodes in use.
Figure 4:
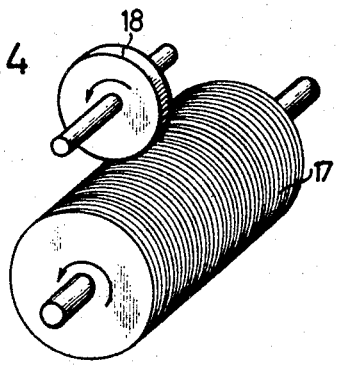

FIGURE 3 shows how a surface 19 of a body formed of a plurality of laminations (or a solid body) can be machined by means of a rotating disk electrode 18 performing an electro-erosive procedure. FIGURE 4 shows how such an electrode can also be employed in finishing off a rotor 17 composed of a stack of dynamo-iron laminations.

Figure 5:
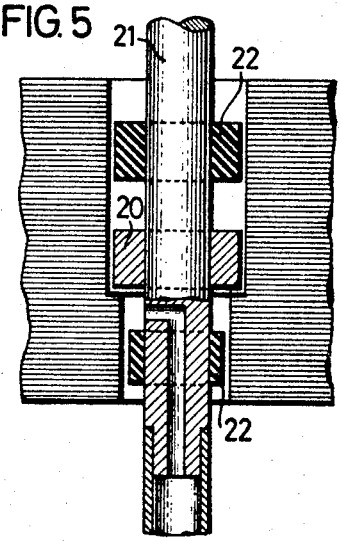
FIG. 5 is a cross-sectional view of a stack showing electrode guides.

FIGURE 5 shows an arrangement suitable for the electro-erosive finishing of an elongated opening of irregular kind. In order that the electrode 20 may follow, as exactly as possible, the premachined opening, the elongated electrode holder 21 is guided longitudinally by means of two guide collars 22 mounted thereon in insulated fashion. At the same time to assure an adequate supply of dielectric to the electrode, and to draw it off again, the holder 21 is made hollow as shown.

FIG. 7 is a schematic representation of a synchrotron or circular path atomic particle accelerator, showing some of the separate magnets 25. One of these is shown by itself in FIGURE 6.

The magnet 25 is constructed, for example, of parallel stacked metal laminations 27. They are held together by reinforcing strips 29 which may be welded thereto, thus forming a magneto block. The configured surfaces 31 and 33 on the two poles are hyperbolic and must be exceedingly precise, dimensionally. The fact that each magnet 25 may have a lentgh of from 2.5 to 4 meters imposes the highest demands upon the nature and quality of the machining that is required. The dimensional accuracy of the pole curvatures, especially the surfaces 31 and 33, must be $\leq 0.1$ millimeter. While this may be attainable by conventional means in connection with single laminations, it is not possible of achievement in magnetic structures formed of a multiplicity of layers.

This type of structure, which weighs a ton or more, is reinforced by three supports 35, 36 and 37. Because of the great weight involved, and the long spacing between supports, this type of magnet body sags to an extent that distorts the contoured surfaces 31 and 33. Therefore, in order to comply with the exact dimensions required a refinishing operation is necessary. The electroerosion process is excellently adapted to serve this purpose because it does not require unusual force and can machine laminated or solid units of this kind in situ to the finest tolerances and with the best surface finishes. Moreover, there is the ability to guide the electrode in appropriate manner so that its movements will conform accurately to the circular arcuate disposition of the magnet, whereby the corresponding points of the hyperbolic lines are located along circular arcs. Also, in this way the magnet surfaces 39 can be machined, in situ, to conform accurately to a circular arc. As a result, radiation losses of circular-path accelerators can be considerably reduced.

A digitally programmed guidance may be provided for the curved feeding movements of the electrode. In this way, the invention provides an economically feasible method and apparatus for eliminating inaccuracies caused during the fabrication, assembly, and installation of magnetic structures, especially the very large type of structure, of the character described.

What is claimed is:

1. A method of producing the individual magnets of a circular-path atomic particle accelerator, comprising the steps of forming individual laminations of magnetic material, each lamination presenting two spaced apart poles, stacking a plurality of said laminations which have been machined to about the same tolerance, arranging reinforcing strips longitudinally along the stack and securing the strips to the laminations to form a magnet, providing the magnet with three supports, installing the magnet on its supports in the circular-path accelerator with certain surfaces of the magnet facing the center point of the accelerator, whereupon a change in shape of the magnet surfaces occurs due to its great weight and the span between its supports, and thereafter machining the surfaces of the poles and the surfaces facing the accelerator center by an electrical discharge technique so as to eliminate the change in shape of these surfaces occuring after installation of the magnet.

References Cited

UNITED STATES PATENTS

| 2,479,302 | 8/1949 | Bondley | 204—140.5 |
| 2,764,540 | 9/1956 | Farin et al. | 204—140.5 |
| 2,902,584 | 9/1959 | Ullmann | 219—69 |
| 3,060,114 | 10/1962 | Sanders | 204—143 |
| 3,223,603 | 12/1965 | Inove | 204—143 |
| 3,281,343 | 10/1966 | O'Connor | 204—143 |

FOREIGN PATENTS 373,489    1/1964    Switzerland.

ROBERT K. MIHALEK, *Primary Examiner*.